United States Patent [19]

Gellekink et al.

[11] Patent Number: 4,622,554
[45] Date of Patent: Nov. 11, 1986

[54] PULSE RADAR APPARATUS

[75] Inventors: Bernard Gellekink, Ootmarsum; Hilbert Bisschop, Goor, both of Netherlands

[73] Assignee: 501 Hollandse Signaalapparaten B.V., Hengelo, Netherlands

[21] Appl. No.: 569,872

[22] Filed: Jan. 11, 1984

[30] Foreign Application Priority Data

Jan. 18, 1983 [NL] Netherlands ............... 8300178

[51] Int. Cl.⁴ ............................................ G01S 13/86
[52] U.S. Cl. ............................................ 342/67
[58] Field of Search .............. 343/7 G, 7.3, 7 ED, 343/55 A, 12 MD, 7 A

[56] References Cited

U.S. PATENT DOCUMENTS 3,201,788  8/1965  Hertwig ........................... 343/7.3
4,015,258  3/1977  Smith et al. .................... 343/7 G X
4,124,849 11/1978  Zahornasky et al. ........... 343/76
4,148,026  4/1979  Gendreu ......................... 343/7.3 X
4,442,431  4/1984  Bleakney ........................ 343/7 ED Primary Examiner—T. H. Tubbesing
Assistant Examiner—Mark Hellner
Attorney, Agent, or Firm—Robert J. Kraus

[57] ABSTRACT

A pulse radar apparatus (2) for target (14) tracking is designed to provide angular error data representing the deviations of projectiles, fired from a gun (3) at the target with respect to the target position line. The l.f.-signal processor of said radar apparatus comprises:

a. a signal analyzer (17) having a filter bank for determining Doppler spectral components of echo signals received from the fired projectiles within the target range gate (23) and l.f. detected;

b. selection means (18) for selecting the projectile Doppler spectral components from the signal analyzer (17) and filter bank; and c. an angular error generator (24) for generating angular error data from the Doppler spectral components selected by the selection means (18) to correct gun aiming values calculated by a fire control computer (9).

11 Claims, 5 Drawing Figures

PULSE RADAR APPARATUS

BACKGROUND OF THE INVENTION

The invention relates to a pulse radar apparatus for target tracking, which radar apparatus is designed to provide angular error data representing the deviations of projectiles, fired from a gun at the target with respect to the target position line. By "targets" are meant in particular self-propelled missiles, whereas the gun-fired projectiles are preferred to follow a ballistic trajectory.

Such a pulse radar apparatus is known from the U.S. Pat. No. 3,201,788. In the radar apparatus described in this specification, two auxiliary range gates placed at both sides of the target range gate are positionable in accordance with the displacement of the target range gate, so that each of them passes exclusively echo signals, in particular from the gun-fired projectiles, in the range intervals corresponding with the two auxiliary range gates. These echo signals are used to measure the deviations of the projectiles with respect to the antenna line of sight in passing through the range intervals; subsequently, the deviations of the projectile prevailing at the target position are determined by interpolation. The above patent specification emphasises that, to obtain accurate angular error data about the deviations of the gun-fired projectiles prevailing at the target with respect to the target position line, it is not very well possible to use the projectile echo signals passed through the target range gate, as these signals cannot be distinguished from the target echo signals. The indicated determination of the desired angular error data has the disadvantage that the curved path described by the projectiles between the two auxiliary range gates is approximated by a straight line, resulting in incorrect values of the angular errors. Besides, there is a cumulation of errors due to the parallax between the pulse radar apparatus and the gun, making accurate computation of the angular errors by the method of interpolation very complicated. The present invention has for its object to provide a solution to these problems, which solution is based on the measurement of echo signals received from both the target being tracked and the gun-fired projectiles in the same range gate, i.e. the target range gate.

SUMMARY OF THE INVENTION

According to the invention, the l.f.-signal processor in a radar apparatus of the type set forth in the opening paragraph comprises:
a. a signal analyser with a filter bank for determining Doppler spectral components of echo signals received from the fired projectiles within the target range gate and l.f. detected;
b. selection means for selecting the projectile Doppler spectral components from the signal analyser and filter bank; and
c. an angular error generator for generating angular error data by use of the Doppler spectral components selected by the selection means to correct gun aiming values calculated by a fire control computer.

It should be pointed out that there are still other methods to determine the angular error data, as appears from the U.S. Pat. No. 3,333,264.

BRIEF DESCRIPTION OF THE DRAWING

The invention will now be described in more detail with reference to the accompanying figures, of which.

DESCRIPTION OF THE PREFERRED EMBODIMENT

Figure 1:
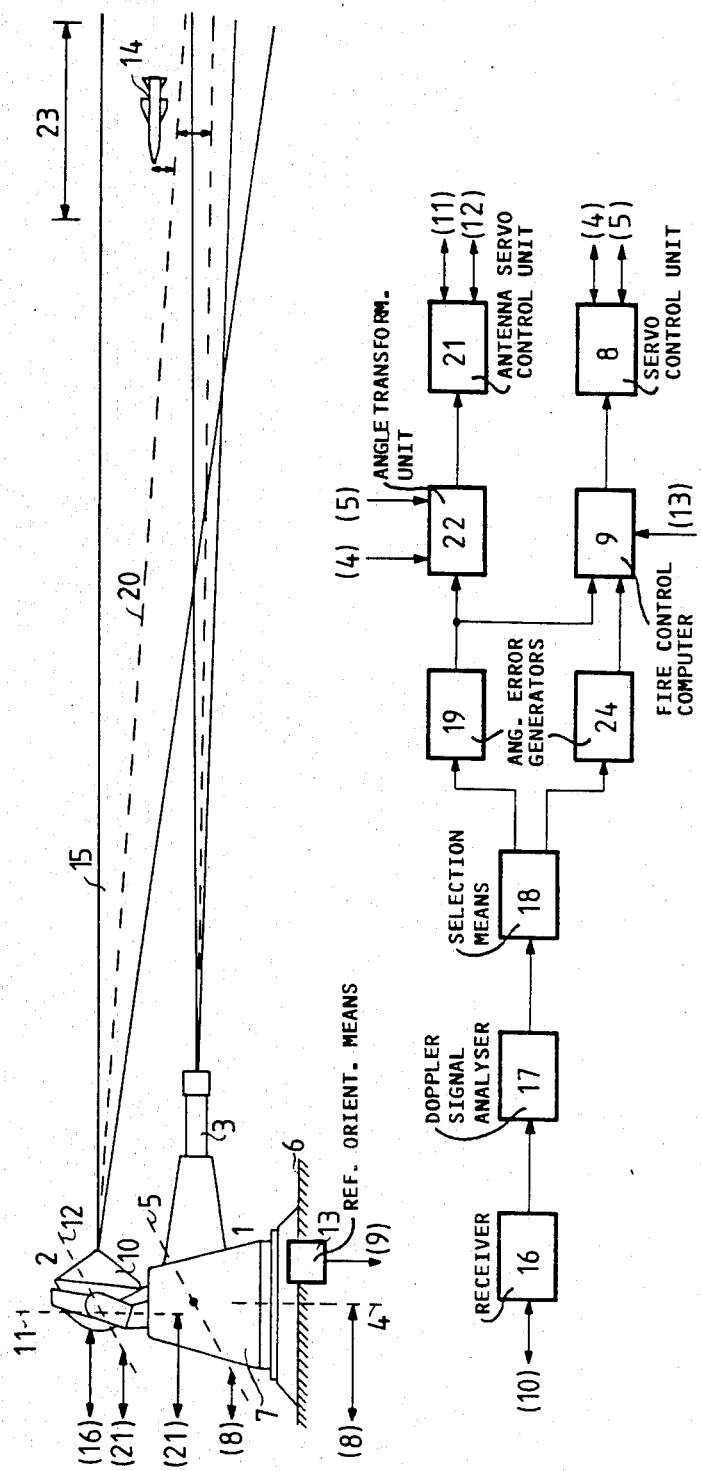
FIG. 1 is a schematic illustration of a weapon control system provided with a pulse radar apparatus according to the invention.

In FIG. 1, there is illustrated a weapon unit 1, fitted with target tracking means 2. The gun 3 of the weapon unit 1 is slewable about two mutually perpendicular axes 4 and 5, where axis 4 is perpendicular to a reference plane 6, and axis 5 is mounted parallel to plane 6 in the turret 7 of the weapon unit 1. Instead of a two-axis arrangement of unit 1, a three-axis arrangement can be used. For an arrangement of the weapon unit 1 on board a ship, the reference plane 6 is formed by the platform of the on-deck turret base, so that axis 4 permits a slewing motion of gun 3 in a given training and axis 5 a slewing motion to a given aiming angle. The slewing motion of the weapon unit 1 is obtained with a servo control unit 8, operating on rotation axes 4 and 5; a fire control computer 9 supplies the servo control unit 8 with the angular data required for the slewing motion. On the ground of the target data obtained with the target tracking means 2, the fire control computer 9 determines the target track and therefrom the gun training and elevation values in a fixed, horizontally oriented coordinate system. For a shipborne weapon unit 1 it is therefore necessary to transform the thus calculated gun values to a coordinate system coupled to the deck plane; this transformation occurs in fire control computer 9 as well. Also the target data processed in fire control computer 9 must be defined in the horizontal coordinate system.

The target tracking means 2, required to obtain the above target data, may be composed in different ways; it is not necessary to utilise exclusively a tracking radar with a tracking antenna 10, as shown in FIG. 1, but optical means, such as an infrared detector, a TV unit, and a laser rangefinder, may be employed. It is also possible to employ a combination of both optical and radar means in obtaining the target tracking means 2.

In the preferred embodiment of a weapon control system, as illustrated, the target tracking means 2 are mounted on the gun 3 and are able to slew about two mutually perpendicular axes 11 and 12, of which axis 11 is perpendicular to the plane passing through axis 5 and the bore axis of gun 3, and axis 12 perpendicular to the plane passing through axis 11 and the bore axis of gun 3. Instead of a two-axis arrangement of the tracking means 2, a three-axis arrangement can be used.

In the embodiment in question the target data obtained with target tracking means 2 are determined in a coordinate system coupled to the deck plane and must be transformed to the horizontal coordinate system for subsequent processing with the target data already present. The target tracking means 2 are not only intended for the acquisition of target data to provide aiming data for the weapon unit 1, but they also serve to supply data about the trajectory of the projectiles fired by unit 1 to determine whether the projectiles follow the desired trajectory. Any trajectory deviations of the projectiles established can be used to correct training and elevation values for the weapon unit 1.

For the data transformation from the ship-fixed coordinate system to the horizontal coordinate system and vice versa, it is preferred to mount reference orientation means 13 on the turret base in order to determine the compass and the cross level angles of the weapon unit 1. The data obtained from means 13 are supplied to the fire control computer 9. If necessary, these data can be combined with data supplied by a central stabilisation unit, usually mounted at the ships centre; this stabilisation unit is not shown in the figure.

FIG. 1 illustrates that the tracking antenna 10 of the tracking radar is so directed that a target 14 is situated in the radar beam 15. The echo signals of target 14 acquired by tracking antenna 10 are detected in a receiver 16 connected to tracking antenna 10; the then obtained sum and difference signals are processed successively by spectral analysis in a Doppler signal analyser 17 with a filter bank. Receiver 16 is preferably designed to process the received echo signals on a quadrature basis, while the signal processing in analyser 17 operates on the FFT principle. In analyser 17 and filter bank the Doppler spectral components of the sum or difference signals are distributed over the various frequency intervals. Selection means 18 connected to analyser 17 are employed to select the target Doppler spectral components, which are supplied to an angular error generator 19 for the determination of the angular errors of target 14 with respect to the radar bore sight axis 20. These angular errors are used to direct the tracking antenna 10 at the target by means of an antenna servo control unit 21 operating on rotation axes 11 and 12. The required target angular errors may also be determined separately or in combination by optical tracking means; in this case, the connection between means 18 and generator 19 is left out.

In case the tracking antenna 10 is mounted on gun 3, allowance must be made for the given gun aiming values in directing the antenna 10. To this effect, an angle transformation unit 22 is incorporated in the connection between the angular error generator 19 and the antenna servo control unit 21; unit 22 corrects the angular errors produced by generator 19 upon a change of the aiming values extracted from the synchros of axes 4 and 5.

The fire control computer 9 uses the angular errors supplied by angular error generator 19 to generate the track of target 14. Such a target usually follows its prescribed path with an oscillatory motion; therefore, to calculate the target track, a distinction must be made between the "true target trajectory", still containing the oscillatory motion in the generated track, and the "smoothed target track", in which the oscillatory motion has been filtered out of the generated track.

From the generated target track the predicted hitting point and hence the gun aiming values are continuously calculated. The predicted hitting point is the calculated point in space, where a projectile is to hit the missile after a certain time of flight starting from the time of firing. The echo signals of the projectiles, which are within a fixed range gate 23 around the target 14, are detected and processed in receiver 16. Thereafter, the Doppler spectral components of the projectiles are selected by means 18 in the signal analyser 17; these components are supplied to a second angular error generator 24 to determine angular error data of the projectiles with respect to the radar boresight axis 20. On the basis of these data the fire control computer 9 corrects the latest given aiming values, resulting in a correction of the gum aiming and in this case a correction in the direction of antenna 10 as well.

Target tracking means 2, containing a receiver 16 and an FFT signal analyser 17 connected thereto, are well known, and are described in the European Patent Specification 0 027 122. The radar apparatus described in this patent specification is shown schematically in FIG. 2 and is of the type based on the socalled sum and difference method, permitting to track a moving target 14 in two angular coordinates and in range.

Figure 2:
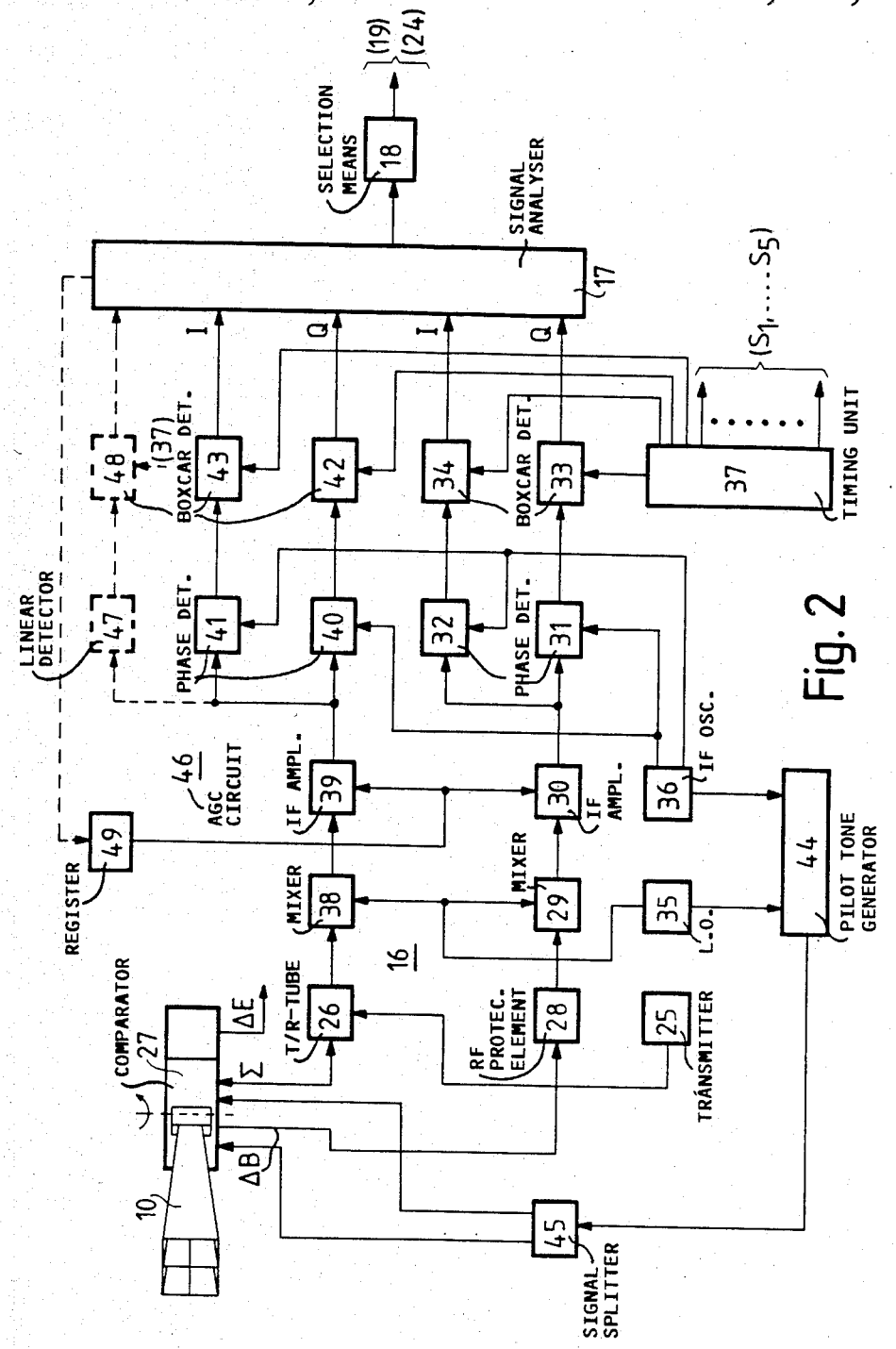
FIG. 2 is a block diagram of a feasible embodiment of a pulse radar apparatus for the weapon control system of FIG. 1.

The transmitter pulses from transmitter 25 of the radar apparatus are passed, via an RF transmit-receive tube 26, to the tracking antenna 10, from where the transmitter pulses are emitted, while the associated echo signals are detected. As is customary with such a radar apparatus, the energy received with a target echo signal is divided by a comparator 27 to obtain an elevation difference signal $\Delta E$, an azimuth difference signal $\Delta B$, and a sum signal $\Sigma$. These signals contain amplitude and phase data, which is a measure for the magnitude and direction of the deviation of the object being tracked with respect to the radar boresight axis 20, and can be utilised to generate error voltages for the antenna servo control unit 21. With the aid of these means the target is tracked in azimuth and elevation. The $\Delta B$, $\Delta E$ and $\Sigma$ signals are supplied to the receiver 16 for processing in separate channels. For the sake of simplicity, FIG. 2 shows, apart from the $\Sigma$ channel, only the $\Delta B$ channel as the $\times E$ channel is of similar design. The $\Delta B$ channel comprises in succession an RF protection element 28, a mixer 29, an intermediate-frequency amplifier 30, two phase detectors 31 and 32, and two boxcar detectors 33 and 34. One of the functions of the protection element 28 is to protect the $\Delta B$ channel against reflections which originate from the transmitter signal and are likely to be coupled into the $\Delta B$ channel via comparator 27. To exclude unnecessary phase differences in the two RF channels, the protection element 28 is identical to switch 26. In mixer 29 the RF $\Delta B$ signal is converted into an IF signal, using an RF signal produced by local oscillator 35. An IF oscillator (COHO) 36 produces two signals having a mutual phase shift of 90°; these signals are used for the coherent detection of the IF signal in phase detectors 31 and 32.

The transmitter 25 consists of a pulsating RF oscillator and is therefore active only during the generation of a transmitter pulse; this implies that the phase of the signal derived therefrom is distributed practically at random with respect to the local oscillator output signal. To obviate the consequences thereof, the transmitter and receiver unit 25, 16, is so designed that in each pulse repetition time there is a correct phase relationship between the transmitter pulse, the local oscillator signal and the COHO signal. In this way it is achieved that the echo signal of an ideal fixed target transformed to the intermediate frequency always has the same phase relationship with respect to the COHO signal; consequently, after mixing in the phase detectors 31 and 32, a pulse of constant amplitude is obtained. For a moving target, the above phase relationship and hence the amplitude varies with the Doppler frequency shift.

The boxcar detectors 33 and 34 connected to phase detectors 31 and 32 respectively have a twofold function. First, the detectors 31 and 32 make a range selection, i.e. only the echo pulses being passed are those falling within a range gate 23 determined by a timing unit 37. Second, pulse stretching takes place in these detectors such that a staircase signal is obtained at the output of boxcar detectors 33 and 34.

The Σ channel comprises the RF transmit-receive tube 26, a mixer 28, an IF amplifier 39, two phase detectors 40 and 41, and two boxcar detectors 42 and 43. With these elements the RF Σ signal is processed in the same way as described for the ΔB signal, so that after phase detection a pulse of constant amplitude is obtained for echo signals from fixed targets, whereas this amplitude for echo signals of a moving target varies with the Doppler frequency $f_D$. The signals from phase detectors 40 and 41 are supplied to boxcar detectors 42 and 43, in which these signals are subjected to the same process as described for boxcar detectors 33 and 34. The staircase signals from detectors 33, 34, 42 and 43 are supplied to the signal analyser 17, where they are filtered. The signals so obtained are supplied separately to the angular error generators 19 and 24 to determine the real values of the signals ratios $\Delta B_D/\Sigma_D$ and $\Delta B_p/\Sigma_p$, which are representative of the error voltages relative to, respectively, the target and the projectiles in azimuth. The disadvantage still attached to this method is that the values of these ratios are strongly influenced by the fact that with the passage of the signals through the two receiver channels a variation arises in the relative phase and amplitude relationship between the channels. Therefore, the signal ratios $\Delta B_D/\Sigma_D$ and $\Delta B_p/\Sigma_p$ thus determined must be corrected for errors due to this variation; this correction is made by using a pilot tone generator 44, artificially producing echo signals, known as pilot tone signals, having a known phase and amplitude. The pilot tone signals are applied to a signal splitter 45 for injection (preferably via comparator 27) into the ΔB and the Σ channels for subsequent processing; this is known from the U.S. Pat. Nos. 3,794,998, 3,950,750 and 3,883,870 and the European Patent specification 0 027 122. The last specification discloses that for two different objects, in this case target 14 and the projectiles, phase and amplitude correction factors can be determined from the pilot tone signals corrected for the Doppler frequencies and that the angular error signals pertaining to target 14 and to the projectiles can be corrected for these factors in the angular error generators 19 and 24.

It is further known to provide the radar receiver with an AGC circuit 46 for determining the gain of IF amplifiers 30 and 39. To this effect, receiver 16 comprises a linear detector 47, connected to the output of IF amplifier 39, and a boxcar detector 48 coupled thereto and controlled by timing unit 37. Only the sample values of the target echo signals obtained from the boxcar detector 48 are supplied to the signal analyser 17 to determine a control factor for IF amplifiers 30 and 39. This factor is stored in a register 49 and can be used at any desired moment after D/A conversion for the gain setting of IF amplifiers 30 and 39.

Instead of designing the target tracking means fully as a radar, it is also possible to track the projectiles with radar means and the target 14 with optical means. Target 14 can be tracked, for instance, in range with a laser rangefinder and in angles with a TV camera (or IR camera). From the angular and range values obtained therefrom new aiming values for the radar and optical tracking means 2 and the gun 3 can be derived. The range gate 23 for the radar tracking means for the tracking of the projectiles in the vicinity of target 14 is set at the target range measured with the laser rangefinder. The relative angle between the (now optically obtained) predicted hitting point and the projectiles at this point is therefore obtained from an optically determined angle (for target 14 expected there) and a radar-determined angle (for the projectiles). It is however also possible to determine the target range by radar means and to perform the angular tracking of target 14 by optical means. This will also provide the range gate 23, within which the radar observations on the projectiles must be made. If in each measurement by analyser 17 there are several Doppler spectral components pertaining to the echo signals of projectiles, it is possible to select, for instance, the strongest component of the Σ channel, provided this component be derived from echo signals of the projectiles. The frequency components pertaining to the projectiles have to be recognised and selected within the frequency spectrum on the basis of previously made observations. As the target 14 is tracked already from afar, the Doppler spectral components of the target echo signal are already known before the detection of projectile echo signals within the range gate 23. The Doppler spectral components pertaining to the projectile echo signals are localised by carrying out, during the tracking of the target, another radar measurement on the projectiles within the target range but outside the range gate 23; since with this measurement no echo signals of target 14 are involved, the localisation of the Doppler spectral band, to provide the Doppler spectral components pertaining to the projectiles, is simplified.

Besides the classical method of the determination of a range gate 23, it is also possible to take an even number of samples at successive (small) distances in an area around the target 14 and thus at a very high sampling rate in the sum channel behind the phase detectors 40 and 41, to convert these samples into digital form, to determine a separate sum value for both the first and the second halves of the number of samples, and to derive from the difference between the two sum values a range error for range gate 23. The analogue-digital conversion therefore does not take place in the analyser 17 after the multiplexer (as described in the cite European patent specification), but before the analyser 17. This method of sampling, A/D conversion and multiplexing of the various video signals can also be applied in other receiving channels, where the integrating effect of the boxcar detectors is obtained by summing the samples within a range gate 23.

Figure 3:
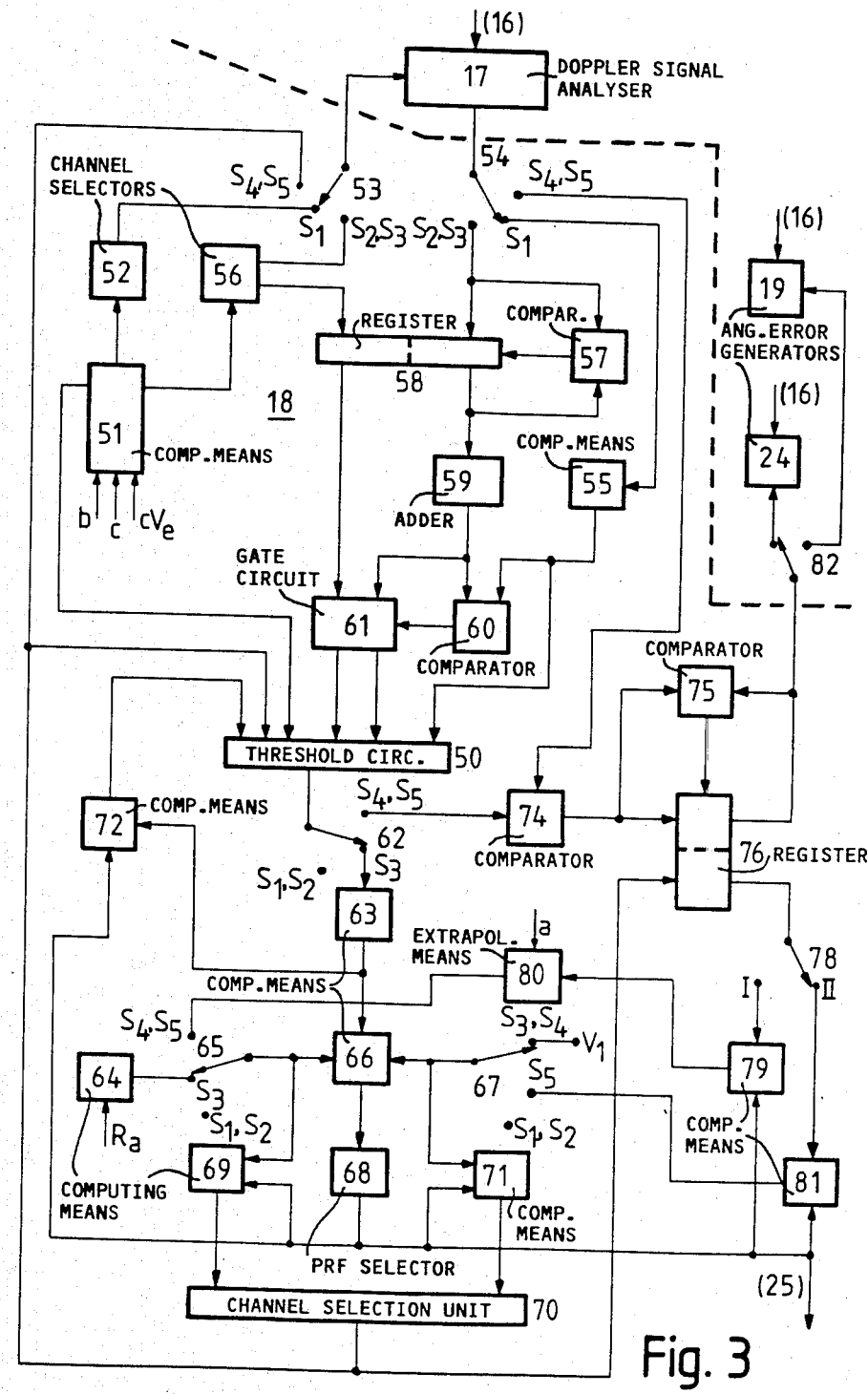
FIG. 3 is a block diagram of a feasible embodiment of the selection means of the l.f.-signal processor contained in the radar apparatus.

FIG. 3 shows a feasible embodiment of means 18 for selecting target and projectile Doppler spectral components separately from signal analyser 17 operating on the FFT principle. The selection means 18 comprise a threshold circuit 50 to check whether the various Doppler spectral components exceed a certain frequency-depending threshold value. Therefore, the threshold circuit 50 has a separate threshold for the FFT channels containing rain clutter and a separate threshold where only noise determines the signal background. The threshold for fixed clutter can be set to a maximum value; this means a blocking of the outputs of the FFT channels containing fixed clutter.

The threshold values for circuit 50 may be determined as follows:

Computing means 51 receives the ship's own course $CV_e$; from the result of $(CV_e)/d$, where d is the FFT channel resolution at a certain initial p.r.f., means 51 determines the number (a) of the channel receiving Doppler frequency components of echoes from targets having zero velocity. A certain, fixed Doppler spectral range (corresponding with six FFT channels) within the FFT spectrum is assigned to the fixed clutter, so that the outputs of the FFT channels with numbers a−b to a+b can be blocked. Rain clutter can still be expected in an adjoining area at one of the two ends of the FFT channel range (a−b, a+b), viz. in a Doppler frequency range corresponding with a certain number (c) of channels. Still left to be determined is the side of the fixed clutter region where the rain clutter will reside. A noise threshold value for the remaining part of the FFT spectrum can subsequently be established, although an increased threshold, if desired, may be added to certain channels. From computing means 51 a first channel selector 52 receives the channel numbers 0 to a−b−c−1 and the numbers a+b+c+1 to N−1, where N is the number of FFT channels of signal analyser 17, and selects, via a switch set to position $S_1$ by a timing unit 37, the particular channels in succession to read therefrom the calculated spectral values and to supply these values to computing means 55 via switch 54 in the $S_1$ position. Computing means 55 determines an average noise threshold from the formula $(\Sigma A)/M+C_1$, where $\Sigma A$ is the sum of the read spectral values, M the number of read FFT channels, and $C_1$ a constant.

In a second stage, when switches 53 and 54 are set to position $S_2$ by timing unit 37, the FFT channels are checked for the presence of rain clutter with the aid of a second channel selector 56, which is thereto supplied with channel numbers a−b−c to a−b−1 and numbers a+b+1 to a+b+c from computing means 51. The spectral values are read from the particular FFT channels in succession and supplied to a comparator 56. Comparator 56 also receives a value stored in register 58 to check whether the value from signal analyser 17 is greater than that from register 58. With a positive response of this check, the comparator 57 supplies a write pulse to register 58 to overwrite the contents of this register by the value supplied from signal analyser 17. Register 58 also stores the FFT channel range (a−b−c, a−b−1) or (a+b+1, a+b+c), whichever includes the FFT channel containing the maximum amplitude; the stored FFT channel range indicates the side of the fixed clutter region where the rain clutter resides. It should however first be determined whether rain clutter is involved. To this effect, the value in register 58 is increased by the abovementioned constant $C_1$ (in adder 59). In comparator 60 the resulting value is them compared with the noise threshold value from computing means 55. If the value from adder 59 is indeed greater than that from means 55 (rain clutter is actually involved), the comparator 60 produces a write pulse for a gate circuit 61, connected to register 58 and adder 59, causing the FFT channel range of the rain clutter in register 58 and the value in adder 59 to be written in threshold circuit 50. In this way the threshold circuit 50 received the necessary information (a−b, a+b) about the clutter region to be blocked, the data (a−b−c, a−b−1) or (a+b+1, a+b+c) about the rain clutter region and the associated rain clutter threshold and the noise threshold $$\left(\frac{\Sigma A}{M} + C_1\right)$$

obtained from computing means 55 for the remaining FFT channels.

It is however possible that with the selected p.r.f. (for obtaining the data of threshold circuit 50) the Doppler spectral components of the video signals of the target and/or the projectiles find their way to the clutter regions. It is therefore preferable to select such a p.r.f. that the clutter spectral range, the spectral lines pertaining to the target, and the spectral lines pertaining to the projectiles in signal analyser 17 are separated as well as possible. In the embodiment in question, the solution to this problem consists in establishing the p.r.f. intervals without any spectrum conflicts, i.e. p.r.f. intervals giving such spectral resolutions in the signal analyser that the Doppler spectral lines or ranges of video signals from different objects are spaced sufficiently apart in the FFT spectrum.

The above may be explained by the following example. If a radar, operating at a transmitter frequency $f_z$ with a pulse repetition frequency $f_r$ and containing an FFT signal processor with N Doppler spectral channels, receives an object 1 (e.g. the target) moving at a Doppler velocity $V_1$, the spectral line is received in channel $k_1$ defined by:

$$k_1 = \frac{2V_1 N f_z}{c \cdot f_r} - m_1 \cdot N,$$

where $m_1 \epsilon Z$ is such that $0 \leq k_1 \leq N-1$.

Similarly, a second object 2 (e.g. the projectile) moving at a velocity $V_2$ will give a spectral line in channel $k_2$ expressed by:

$$k_2 = \frac{2V_2 N f_z}{c \cdot f_r} - m_2 \cdot N.$$

If FFT channels $k_1$ and $k_2$ must have a resolution $\Delta k$, the following relationship is obtained:

$$k_1 = k_2 \pm \Delta k,$$

from which, as solution for the p.r.f., it follows that:

$$f_r = \frac{(V_1 - V_2) \cdot 2N \cdot f_z}{c \cdot \{(m_1 - m_2) \cdot N \pm \Delta k\}}$$

or for the pulse repetition time $T_r$:

$$T_r = \frac{c \cdot \{(m_1 - m_2) \cdot N \pm \Delta k\}}{2(V_1 - V_2) \cdot N \cdot f_z}.$$

This results in the following p.r.t. intervals $(\Delta T)_m$ without any spectrum conflicts between the spectral lines of the target and a projectile:

$$\left\{\frac{c \cdot \Delta k}{2|V_1 - V_2| \cdot N \cdot f_z}, \frac{c(N - \Delta k)}{2|V_1 - V_2| \cdot N \cdot f_z}\right\},$$

-continued $$\left\{ \frac{c(N + \Delta k)}{2 |V_1 - V_2| \cdot N \cdot f_z}, \frac{c(2N - \Delta k)}{2 |V_1 - V_2| \cdot N \cdot f_z} \right\},$$

$$\left\{ \frac{c(2N + \Delta k)}{2 |V_1 - V_2| \cdot N \cdot f_z}, \frac{c(3N - \Delta k)}{2 |V_1 - V_2| \cdot N \cdot f_z} \right\}, \text{etc.}$$

With the determination of the p.r.t. intervals without any spectrum conflicts in the processing of echo signals from object 1 (target) and clutter signals, first the upper and lower limits of the entire clutter region must be converted into Doppler velocities ($V_3$ and $V_4$, respectively).

From the relationships:

$$k_3 = \frac{2V_3 \cdot N \cdot f_z}{c \cdot f_r} \text{ and } k_4 = \frac{2V_4 \cdot N \cdot f_z}{c \cdot f_r},$$

provided $K_1 \geq k_3 + \Delta k$ and $k \leq k_4 - \Delta k$, the following p.r.t. intervals $(\Delta T)_p$ will result:

$$\left\{ \frac{c \cdot \Delta k}{2N |V_1 - V_3| f_z}, \frac{c(N - \Delta k)}{2N |V_1 - V_4| f_z} \right\},$$

$$\left\{ \frac{c(N + \Delta k)}{2N |V_1 - V_3| f_z}, \frac{c(2N - \Delta k)}{2N |V_1 - V_4| f_z} \right\},$$

$$\left\{ \frac{c(2N + \Delta k)}{2N |V_1 - V_3| f_z}, \frac{c(3N - \Delta k)}{2N |V_1 - V_4| f_z} \right\}, \text{etc.}$$

Analogously, it can be derived that in the absence of spectrum conflicts with the processing of video signals from object 2 (projectile) and the clutter signals the following p.r.t. intervals $(\Delta T)_q$ are usable:

$$\left\{ \frac{c \cdot \Delta k}{2N |V_2 - V_3| f_z}, \frac{c(N - \Delta k)}{2N |V_2 - V_4| f_z} \right\},$$

$$\left\{ \frac{c(N + \Delta k)}{2N |V_2 - V_3| f_z}, \frac{c(2N - \Delta k)}{2N |V_2 - V_4| f_z} \right\},$$

$$\left\{ \frac{c(2N + \Delta k)}{2N |V_2 - V_3| f_z}, \frac{c(3N - \Delta k)}{2N |V_2 - V_4| f_z} \right\}, \text{etc.}$$

With the calculated p.r.t. intervals $\Delta T_m$, $\Delta T_p$ and $\Delta T_q$ the intersection set of separate p.r.t. intervals $(\Delta T_m \cap \Delta T_p \cap \Delta T_q)$ gives the desired result, i.e. FFT processing without any spectrum conflicts. From this set the p.r.t. interval $\Delta T$ with the highest values is selected, taking into account a certain, permissible selection interval from the pulse repetition frequency and hence an associated, permissible selection range for the pulse repetition time. The selected p.r.t. interval $\Delta T$ corresponds with a p.r.f. interval $\Delta f_r$, in which the centre frequency value is considered to be the usable p.r.f. value for the pulse radar apparatus. To realise the above, the numbers pertaining to the limits of the various threshold ranges with the associated threshold values in the threshold circuit 50 are fed to computing means 63 via switch 62 set to the $S_3$ position. Computing means 63 converts these numbers into equivalent velocity values. In consequence of this, also the velocities $V_3$ and $V_4$ pertaining to the limits of the total clutter region are known. Also determined is the target range from measurements performed with the tracking radar (or with the search radar); this may be supplemented with calculations by target track generation means at a given instant (corresponding with the present instant, if possible). At a given distance (e.g. 30 m) for this target range the timing unit 37 sets an auxiliary range gate, which shifts in range in accordance with the target velocity. Hence, no target echo signals are received in the auxiliary range gate and, as long as no projectiles are fired, no echo signals from projectiles either. An auxiliary range gate thus offers an ideal possibility to determine the data for the threshold circuit 50 and hence data for computing means 63 as well. From the range $R_a$ of the auxiliary range gate, ballistic computing means 64 determines the projectile velocity $V_2$ at the centre of this range gate. The calculated projectile velocity $V_2$ is fed to computing means 66 via switch 65 set to the $S_3$ position; together with the equivalent velocities $V_3$ and $V_4$ from means 63, computing means 66 determines the p.r.t. intervals $(\Delta T)_q$ with due observance of the permissible selection interval for the p.r.f., where no spectrum conflicts are expected between the spectral lines of the projectile video signals to be detected and the spectral lines of the clutter signals. Similarly, the measured target velocity $V_1$ is supplied to means 66 via switch 67 set to the $S_3$ position. With due observance of the selected permissible interval for the p.r.f., computing means 66 determines the p.r.t. intervals, where no spectrum conflicts can be expected between the (fictitious) spectral lines with respect to target video signals (not yet present) and the spectral lines of the clutter signals. Also the p.r.t. intervals $(\Delta T)_p$ are determined with due observance of the selected permissible interval for the p.r.f., where no spectrum conflicts are expected between the (fictitious) spectral lines with respect to target video signals (not yet present) and the spectral lines of the projectile video signals still to be detected. From the set of intervals $\Delta T_m$, $\Delta T_p$ and $\Delta T_q$ the intersection set is determined. From the intersection set a p.r.f. selector 68 selects the highest possible p.r.t. interval, calculates from the limit values of this interval the corresponding p.r.f. values, and generates the average used as p.r.f. value. With this p.r.f value and the projectile velocity $V_2$, supplied via switch 65, computing means 69 determines the number of the spectrum channel in signal analyser 17 for video signals of the projectiles, and selects around this number a continuous group of channel numbers for applications to a third channel selection unit 70. Similarly, computing means 71 calculates from the p.r.f. value selected by p.r.f. selector 68 and from the target velocity $V_1$ supplied via switch 67 a group of numbers indicative of FFT channels related to the target. With the new p.r.f. value, computing means 72 converts the velocity values from means 63 into numbers with respect to FFT channels. These numbers and the associated threshold values are supplied to the threshold circuit 50 to overwrite the existing contents. At a time $S_4$ determined by means 64 and timing unit 37, at which time the projectiles will have reached the auxiliary range gate, the switches 53, 54, 62, 65 and 67 are set to the last position 5. At this stage the analyser 17 processed video signals from the clutter and noise, as well as from the projectiles. The channel numbers obtained from computing means 69 and 71 are fed in succession to signal analyser 17 and threshold circuit 50 via channel selector 70. A comparator 74 receives in succession the amplitudes from the selected FFT channels of analyser 17 and the threshold value from circuit 50. In case the amplitude from an FFT channel is greater than the corresponding threshold value (this is possible only for the FFT channels related to the projectiles), this amplitude is supplied to a second comparator 75. Comparator 75 also receives the value stored in register 76 and, in case the amplitude from comparator 74 is greater than the value supplied by register 76, generates a write pulse for register 76. In response thereto, the old value in register 76 will be overwritten by the amplitude from comparator 74. The same applies to the channel number present in register 76, which number will be overwritten by the channel number of the checked FFT channel; this occurs through the supply of information via channel selector 70. In this way the maximum amplitude of a group of FFT channels selected by computing means 69 is determined; this is desirable because of possible velocity differences of the projectiles, which could be present simultaneously in the auxiliary range gate. The channel number stored in register 76 and pertaining to the FFT channel containing the maximum amplitude is supplied to computing means 79 via switch 78, which is set to position I by the timing unit 37. Computing means 79 converts the FFT channel number into a velocity value by means of the p.r.f. value from selector 68. With the application of classical equations of motion ($s_t = s_0 + v_0 t - \frac{1}{2} a t^2$ and $v_t = v_0 - at$), this velocity value is then extrapolated to a value pertaining to target range gate 23. The required decelleration value a is supplied as known ballistic data.

The extrapolated projectile velocity value is supplied to computing means 66 via switch 65. Using the velocity data stored in unit 63, means 66 redetermines the p.r.t. intervals without any spectrum conflicts. Although the channel numbers determined by means 71 are also supplied to analyser 17 and threshold circuit 50, the amplitudes read from analyser 17 will not pass the comparator 74 (because of the small values of these amplitudes through the lack of target echoes in the auxiliary range gate). Therefore, means 66 will have to use the velocity value of target 14 supplied externally. The calculations in means 66 are performed repetitively, using spectral values from video information from target range gate 23, with switch 65 in the $S_5$ position. The velocity values obtained in means 63 and the associated threshold values remain unchanged with these calculations. Therefore, there will not be a new data flow from computing means 51 and 55 and gate circuit 61 to threshold circuit 50. From the velocity values of means 63, the newly determined projectile velocity, and the externally supplied target velocity, a new p.r.f. value will be determined by means 66 and selector 68. With this p.r.f. value and the velocity and threshold values stored in means 63 the data file of threshold circuit 50 will be updated. From the current p.r.f. value, the projectile velocity and the known target velocity, the channel numbers will be redetermined in computing means 69 and 71. These channel numbers are successively passed to analyser 17 via channel selector 70, while the spectral values from the particular FFT channels are read out and applied to comparator 74. After processing of the supplied spectral values by comparators 74 and 75 and register 76, the identical computing means 79 and 81 receive, via switch 78 set to positions 1 and 2 successively, the number of the FFT channel having the largest spectral value about the video signals of the projectile or target. The extrapolation of the projectile velocity in means 80 will then be cancelled, so that the operation of means 80 can be left out of consideration.

In this stage, also usable error data about the projectiles and the target are obtained. The maximum spectral values selected in register 76 and pertaining to the video signals of the projectiles and the target are supplied to, respectively, the angular error generators 24 and 19 via swtich 82 set to positions 1 and 2 alternately.

The channel numbers selected successively in register 76 are also used to read out the particular FFT channel for the spectral value after separate processing of the video signals from the ΔE and ΔB channels in analyser 17 and to pass these numbers to angular error generators 24 and 19, respectively.

Figure 4:
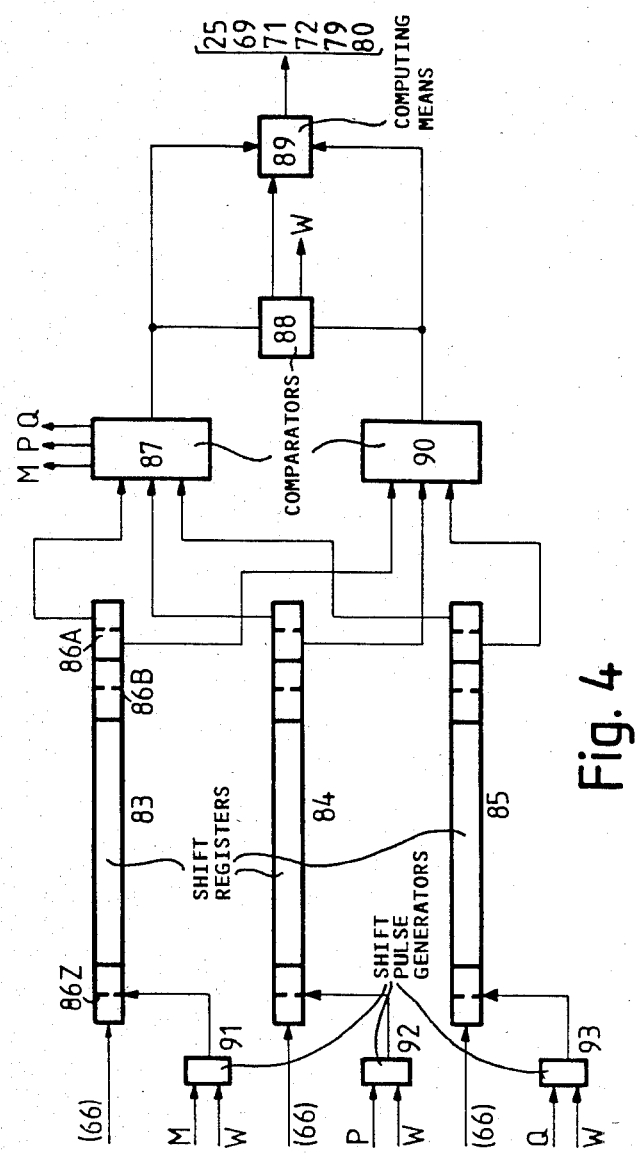
FIG. 4 is a block diagram of a feasible embodiment of a detail circuit contained in the selection means of FIG. 3.

FIG. 4 illustrates a feasible embodiment of a p.r.f. selector 68. This selector comprises three identical shift registers 83, 84 and 85, each of which containing a number of memory locations 86A–Z disposed in pairs. Computing means 66 determines the possible p.r.t. intervals $(\Delta T)_m$ without any spectrum conflicts between target and projectiles, taking into account the permissible maximum value for the p.r.f. The limit values thereof are stored in order of magnitude, i.e. from small to large, at memory location 86Z in register 83 and shifted as far as possible. For each p.r.t. interval, first the lower limit and then the upper limit are applied to register 83. Similarly, computing means 66 determines the possible p.r.t. intervals $(\Delta T)_p$, of which the limit values are stored in register 84. In the same way, register 85 is loaded with limit values of the p.r.t. intervals $(\Delta T)_q$ to be calculated. The minimum limit values of the three lowest p.r.t. intervals, which are stored at memory locations 86A of the three registers 83, 84 and 85, are applied to a comparator 87 to determine the maximum of these values. The maximum value is subsequently applied to a second comparator 88 and to computing means 89. After each complete comparison process, the comparator 87 produces one of the indication signals M, P or Q, depending on the register which supplied the above maximum value to comparator 87. In the same way, a comparator 90 receives the maximum limit values of the lowest p.r.t. intervals of the three registers 83, 84 and 85, and determines therefrom the minimum value. The minimum value is supplied to both the comparator 88 and means 89. Comparator 88 determines whether the maximum value determined in comparator 87 is smaller than the minimum value determined in comparator 90. If so, comparator 88 supplies a control pulse to means 89, which in turn converts the maximum and minimum values from comparators 87 and 90 into p.r.f. values and determines the average thereof to obtain the desired p.r.f. value.

If comparator 88 however establishes that the maximum value from comparator 87 is greater than the minimum value from comparator 90, comparator 88 produces a control pulse W. This control pulse implies that the three checked p.r.t. intervals have no common part. If the p.r.t. interval designated by an indication signal is replaced by the subsequent interval, the comparators 87, 88 and 90 are able to establish with the following check whether the three supplied p.r.t. intervals do have a common part. Following this line of thought, each of the shift registers 83, 84 and 85 is provided with a shift pulse generator 91, 92 and 93, respectively, to deliver a shift pulse to the particular register 83, 84 and 85, respectively, only with the supply of a control pulse W and the associated indication signal M, P and Q, respectively. With this process the limit values of a series of p.r.t. intervals will shift one position, while the pair of limit values already checked will disappear. The checking in comparators 87, 88 and 90 and, if applicable, in means 89 can then be restarted.

Figure 5:
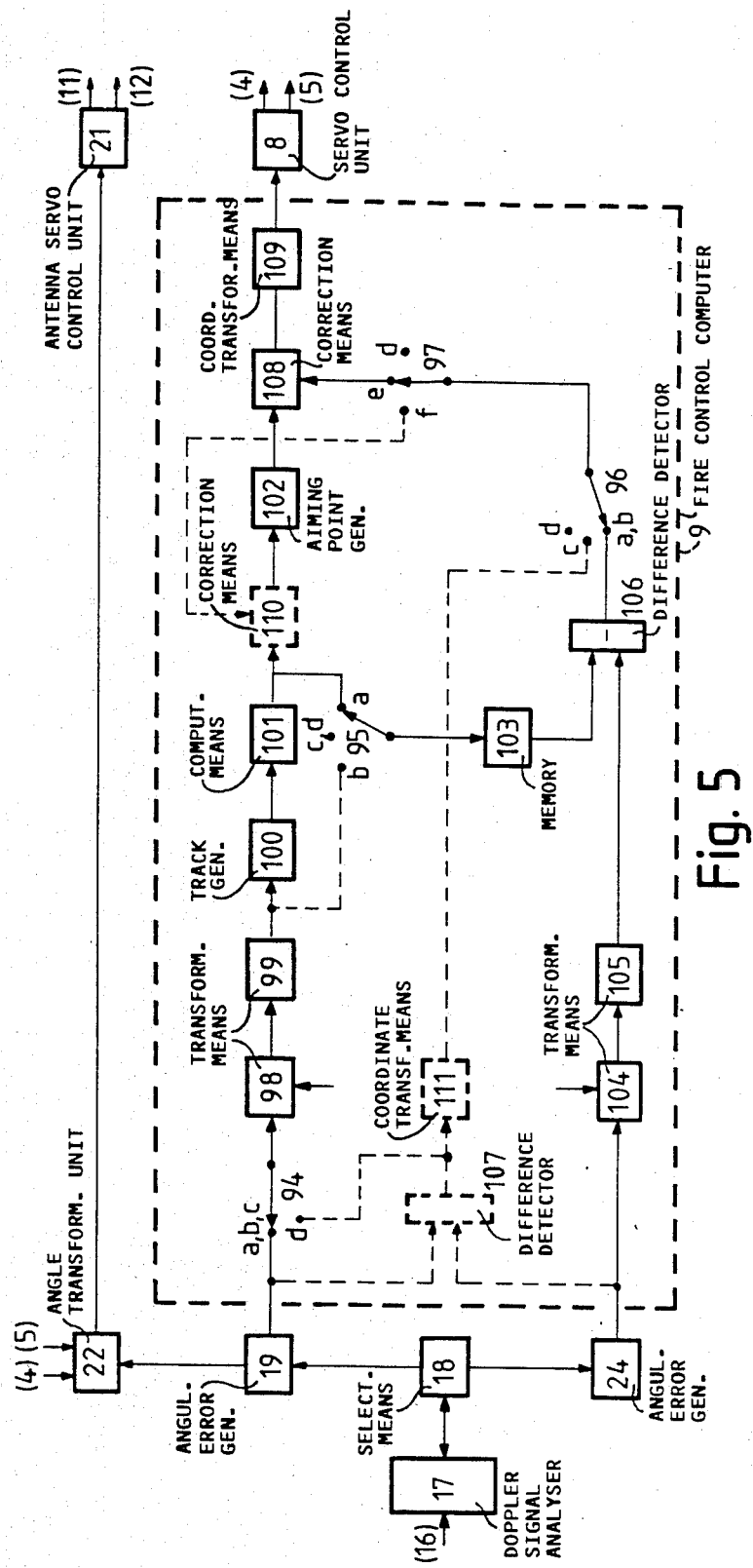
FIG. 5 is a block diagram, illustrating several embodiments of the fire control computer.

The block diagram of FIG. 5 shows a number of embodiments of a fire control computer 9. These embodiments of fire control computer 9 are independent and may be combined with each other. To distinguish between the various embodiments, some of the switches 94, 95, 96 and 97 are shown fictitiously and may be left out in practice.

Embodiment a:

In this embodiment the switches 94, 95 and 96 are in position a and switch 97 in position e. Using the antenna position, means 98 transform the angular errors from angular error generator 19 into coordinates for the target position; this transformation occurs in the ships' deck-fixed coordinate system. Subsequently, means 99 transform the coordinates of the target position to obtain data about the target position in the earth-fixed coordinate system. These data are utilised in a track generator 100 to generate the target trajectory, from which computing means 101 makes a time-reliable prediction of the hitting point. With the predicted hitting point the aiming point generator 102 determines the gun aiming point, using ballistic data. The aiming point should however still be corrected for deviations in the trajectory of the fired projectiles. These deviations are calculated with respect to the predicted hitting point; means 101 transfer the predicted hitting point to a memory 103 before the time of firing. Using the antenna position, means 104 transform the projectile angular errors from angular error generator 24 into angular values referenced to the ship-fixed coordinate system. Coordinate transformation means 105 transform these angular values to the earth-fixed coordinate system for subsequent application to a difference detector 106. Together with the predicted hitting point, transferred to memory 103 at the time of firing, the difference detector 106 determines the angular difference, which is passed as correction to means 108, via switches 96 and 97 (in position e), to correct the supplied predicted hitting point. Coordinate transformation means 109 transform the corrected aiming point to the ship-fixed coordinate system for application to the servo control unit 8 of the gun 3. The angular difference from difference detector 106 can also be used for correcting the predicted hitting point; this requires the incorporation of additive means 110 between means 101 and 102. From the corrected aiming point, means 102 are able to calculate the aiming point which can be utilised directly to drive the servo control unit 8. In this situation the switches are in position f, while means 108 are omitted.

Embodiment b:

This embodiment, in which switches 94, 95 and 96 are in position b, broadly corresponds with embodiment a, but differs in establishing the correction for the aiming point or predicted hitting point. In embodiment b the difference value between the true target position and the projectile position provides the desired correction in earth-fixed coordinates. The target position determined in the earth-fixed coordinate system by means 99 is supplied to difference detector 106 via switch 95. The correction of the aiming point or predicted hitting point proceeds as for embodiment a.

A variant of embodiment b is obtained by supplying a difference detector with the target and projectile positions obtained from means 98 and 104, respectively, and then using the obtained difference value as correction, which may be followed by a coordinate transformation to the earth-fixed coordinate system.

Embodiment c:

In this embodiment, in which switches 94, 95 and 96 are in position c, a difference detector 110 determines the difference value from the angular errors of angular error generators 19 and 24 with respect to the target and projectile positions, respectively; after a coordinate transformation by means 111 this difference value is used as correction for the calculated aiming point or predicted hitting point.

Embodiment d:

In this embodiment, in which switches 94, 95, 96 and 97 are in position d, the difference value obtained from difference detector 110 is fed as a kind of corrected angular error to means 98 to determine the target position, to finally derive by conventional methods the control signals for the servo control unit 8, which control signals are based on the aiming point coordinates. For this process the means 108 and 110 are omitted.

Except for the use of one auxiliary range gate, it is also possible to use two auxiliary range gates within the target range, but outside the target range gate. The first auxiliary range gate is then used for gathering the information for threshold circuit 50, and the second auxiliary range gate for obtaining spectral information about the projectile echo signals.

As known from the cited European patent specification, the receiver 16 should be suitable for the reception of video signals at different ranges (auxiliary range gate(s) and target range gate) within one pulse repetition time. With the use of an auxiliary range gate, the AGC 46 must be adapted to the processing of projectile echo signals; this is also known from the cited European patent specification.

If a rain region moves at great velocity away from the radar tracking apparatus, the Doppler velocity of the rain region may be negative; this manifests itself in the signal analyser 17 by a spectral value in one of the highest FFT channels. Due allowance must be made for this in determining a p.r.f. value without any spectrum conflicts.

Although receiver 16 of FIG. 2 and fire control computer 9 of FIG. 5 use the I and Q components for the video detection and processing of the supplied signals, it is preferable to use the modulus of the I and Q component pairs in determining the thresholds of selection means 18.

We claim:

1. A target tracking pulse radar apparatus for producing angular error data representing deviations of gun-fired projectiles from a target position line, at ranges including those corresponding to a target range gate, characterized in that said radar apparatus includes a low frequency signal processor comprising:
 (a) a signal analyser having a FFT filter bank for determining Doppler spectral components of low-frequency-detected echo signals received from the projectiles within the target range gate;
 (b) selection means for selecting the projectile Doppler spectral components from the signal analyser;
 (c) an angular error generator for generating said angular error data from the Doppler spectral components selected by the selection means, to effect gun aiming correction.

2. A target tracking pulse radar apparatus for producing angular error data representing deviations of gun-fired projectiles from a target position line, at ranges including those corresponding to a target range gate, characterized in that said radar apparatus includes a low frequency signal processor for detecting and processing echo signals in an auxiliary range gate situated within the target range gate, said low frequency signal processor comprising:
  (a) a signal analyser having a FFT filter bank for determining Doppler spectral components of low-frequency-detected echo signals received from the projectiles within the target range gate;
  (b) means for producing selection data about the spectral channels related to fixed clutter and clutter-free spectral channels;
  (c) means for selecting, from the selection data of the clutter-free spectral channels, the spectral values available in said clutter-free spectral channels and for determining a noise threshold value from the selected spectral values;
  (d) a threshold circuit for recording selection data about the spectral channels related to fixed clutter and the clutter-free spectral channels with the noise threshold value;
  (e) means for selecting the projectile Doppler spectral components from the signal analyser using the outputs of the clutter-free spectral channels for comparison of the output values in the latter channels with the noise threshold value; and
  (f) an angular error generator for generating said angular error data from the Doppler spectral components selected by the selection means to effect gun aiming correction.

3. Pulse radar apparatus as claimed in claim 2, characterised in that the low frequency signal processor comprises:
  a. means for establishing, upon the supply of a p.r.f. value, velocity values from the frequency limit values of the total clutter area;
  b. means for calculating permissible p.r.f. ranges with a given channel resolution between the spectral channels with respect to clutter signals, target echo signals, and projectile echo signals;
  c. a p.r.f. selector for selecting the maximum permissible common frequency range from the calculated, permissible p.r.f. ranges and for establishing a suitable p.r.f. value in said common frequency range; and
  d. means for re-establishing, for said threshold circuit, spectral channels related to rain clutter and fixed clutter from said suitable p.r.f. value and the velocity values of the clutter area.

4. Pulse radar apparatus as claimed in claim 3, characterised in that the low frequency signal processor comprises:
  a. means for determining selection data about a group of spectral channels, containing spectral values related to projectile signals, from a specified projectile velocity and p.r.f. value;
  b. means for determining the spectral channel representative of the projectile velocity from said selection data and said threshold value; and
  c. means for extrapolating the spectral channel representative of the projectile velocity at the target location.

5. Pulse radar apparatus as claimed in claim 4, characterised in that the low frequency signal processor comprises:
  a. means for determining selection data about a group of spectral channels, containing spectral values related to the target, from a specified target velocity and p.r.f. value;
  b. means for determining, from said threshold value and spectral values obtained from said selection data, the spectral channel with the spectral value representative of the target velocity for application to the angular error generator related to the target track;
  c. means for selecting spectral values from the spectral channel representative of the target velocity after the determination of spectral values in the signal analyser and filter bank with the supply of output signals obtained from the difference channels for application to said angular error generator.

6. Pulse radar apparatus as claimed in claim 4, characterised in that the low frequency signal processor comprises:
  a. means for determining, from the last-determined projectile velocity and p.r.f. value, selection data about a group of spectral channels containing projectile-related spectral values;
  b. means for determining, from said threshold value and spectral values obtained from said selection data, the spectral channel with the spectral value representative of the projectile velocity for application to an angular error generator related to the projectile track;
  c. means for selecting spectral values from the spectral channel representative of the projectile velocity after the determination of spectral values in the signal analyser and filter bank with the supply of output signals obtained from the difference channels for application to said angular error generator.

7. Pulse radar apparatus as claimed in claim 6, and provided with the fire control computer, characterised in that the fire control computer comprises a track generator for establishing the projectile track from angular error signals fo the angular error generator related thereto to obtain a correction factor of the aiming point after comparison of the data about the established projectile track with the data about the target track.

8. Pulse radar apparatus as claimed in claim 6, and provided with the fire control computer, characterised in that the fire control computer comprises a track generator for establishing the projectile track from angular error signals of the angular error generator related thereto to obtain a correction factor of the predicted hitting point after comparison of the data about the established projectile track with the data about the target track.

9. Pulse radar apparatus as claimed in claim 6, and provided with the fire control computer, characterised in that the fire control computer comprises a track generator for establishing the projectile track from angular error signals of the angular error generator related thereto to obtain a correction factor of the aiming point after comparison of the data about the momentarily established target position and the projectile position.

10. Pulse radar apparatus as claimed in claim 6, and provided with the fire control computer, characterised in that the fire control computer comprises a track generator for establishing the projectile track from angular error signals of the angular error generator related thereto to obtain a correction factor of the predicted hitting point after comparison of the data about the momentarily established projectile track with the data about the target track.

11. A target tracking pulse radar apparatus for producing angular error data representing deviations of gun-fired projectiles from a target position line, at ranges including those corresponding to a target range gate, characterized in that said radar apparatus includes a low frequency signal processor for detecting and processing echo signals in an auxiliary range gate situated within the target range gate, said low frequency signal processor comprising:

(a) a signal analyser having a FFT filter bank for determining Doppler spectral components of low-frequency-detected echo signals received from the projectiles within the target range gate;

(b) computing means for determining, upon the supply of data representing the gun's own motion, selection data about spectral channels related to fixed clutter, spectral channels related to rain clutter, and clutter-free spectral channels;

(c) first means for selecting, from the selection data of the clutter-free spectral channels, the spectral values available in said clutter-free spectral channels and for determining a noise threshold value from the selected spectral values;

(d) means for comparing the spectral values from the spectral channels, related to rain clutter and determined by the selection data, with said threshold value to obtain selection data about the true spectral channels related to rain clutter; and (e) a threshold circuit for recording selection data about the spectral channels related to fixed clutter, the true spectral channels related to rain clutter with the associated threshold value, and the clutter-free spectral channels with the noise threshold value;

(f) second means for selecting the projectile Doppler spectral components from the signal analyser using the outputs of the clutter-free spectral channels for comparison of the output values of the latter channels with the noise threshold value; and (g) an angular error generator for generating said angular error data from the Doppler spectral components selected by the second means to effect gun aiming correction.

* * * * *